United States Patent [19]
Vladar et al.

[11] 3,892,586
[45] July 1, 1975

[54] PROCESS FOR THE PREPARATION OF BUILDING UNITS

[75] Inventors: János Vladár; Ilona Vladár nee Szepes; Mihály Juhász; Peter Vladár; Gábor Vladár, all of Budapest, Hungary

[73] Assignee: Licencia Talalmanyokat Ertekesito Vallalat, Budapest, Hungary

[22] Filed: Apr. 24, 1973

[21] Appl. No.: 354,146

[52] U.S. Cl............. 106/200; 106/202; 106/281 R; 162/171; 162/176
[51] Int. Cl............................................. C08b 27/60
[58] Field of Search .......................... 106/86–88, 106/202, 200, 281, 284, 282; 162/171, 176; 260/28, 200

[56] References Cited
UNITED STATES PATENTS

| | | | |
|---|---|---|---|
| 917,004 | 4/1909 | Mills | 106/202 |
| 1,029,244 | 6/1912 | Tisi | 106/202 |
| 2,072,686 | 3/1937 | Robinson | 106/202 |
| 2,377,491 | 6/1945 | Goodrich | 106/86 |
| 3,224,890 | 12/1965 | Skelton | 106/202 |
| 3,455,852 | 7/1969 | Crist | 260/28 |

OTHER PUBLICATIONS
Chem. Dictionary, p. 867, 1961.

*Primary Examiner*—Theodore Morris
*Attorney, Agent, or Firm*—Young & Thompson

[57] ABSTRACT

Building units of excellent mechanical and thermal properties are prepared by mixing 15 to 85 % by weight of a cellulose-containing base material and/or mineral base material at 120° to 250°C with 10 to 65 % by weight of a 120° to 250°C melt of a residual oil and/or coal distillation residue, wherein prior to mixing 1 to 20 % by weight of an oxide and/or hydroxide of an alkali metal and/or alkaline earth metal are added to the base material and/or to the distillation residue, mixing is continued at least for one minute, and the obtained material is shaped at a temperature above 80°C.

20 Claims, No Drawings

PROCESS FOR THE PREPARATION OF BUILDING UNITS

This invention relates to a process for the preparation of building units from cellulose-containing base materials and/or mineral base materials, using residual oil and/or coal distillation residues, oxides and/or hydroxides of alkali metals and/or alkaline earth metals, and optionally resins and/or framing agents and/or additives.

It is known for several decades that heat-insulating panels can be prepared from cellulose-containing substances, wood materials, etc. and mineral substances, such as pearlite, clay hogging and the like using portland cement, magnesia cement, gypsum, water-glass, bitumen, black pitch or synthetic resins, such as urea-formaldehyde, cresol-formaldehyde or phenol-formaldehyde resins as binding agents.

Expanded cork, prepared by swelling natural cork can be pressed into heat-insulating panels by two methods. According to one of these methods cork is expanded at a temperature of 300° to 400°C under pressing. During this heat treatment resin melts out from the cork simultaneously with the swelling of the cells, which resin sticks the particles on cooling. In such a way a heat-insulating panel of 160 kg./m$^3$ bulk density, sold under the trade name "Expansit" is obtained. According to the other process expanded cork is heat-pressed together with a black pitch binding agent, to obtain "Supramit" panels of 200 kg./m$^3$ bulk density.

When fine cuttings, wood fibres, sawdust or fibrous waste materials obtained in the textile industry e.g., during the processing of hemp are used as starting material and portland cement, magnesia cement or gypsum as binding agent, chaff boards of 620 to 680 kg./m$^3$ bulk densities can be produced. When urea-formaldehyde, cresol-formaldehyde or phenol-formaldehyde resins are used as binding agents together with the same fibrous materials, cutting boards of 550 to 800 kg./m$^3$ bulk densities and fibre boards of 250 to 370 kg./m$^3$ bulk densities can be obtained.

It is also known that heat-insulating panels of 300 to 600 kg./m$^3$ bulk densities can be prepared from swollen pearlite using portland cement, water-glass, bitumen or an urea-formaldehyde resin as binding agent. Starting from swollen clay hogging, heat insulating panels of 600 to 1000 kg./m$^3$ bulk densities can be obtained with portland cement or black pitch binding agents.

Expansit panels have the advantage that they can be exposed to temperatures ranging up to 100°C, with the disadvantage, however, that their production requires high temperatures, and the end-product has high water absorption capacity. Supremit boards, on the other hand, are only slightly water-absorptive and resist fungal attacks, but these boards can only be exposed to temperatures ranging up to 50°C. The cork-base heat insulating panels have the common disadvantages of low compressive strength (about 5 to 10 kg./cm$^2$), limited availability and high production costs.

Wooden boards prepared with the use of portland cement, magnesia cement or gypsum as binding agent have the following disadvantages: they swell when exposed to moisture, their bulk densities are high, and their production time is long. The use of magnesia cement as binding agent involves also the formation of free ions during the binding process, which is disadvantageous since the end-product becomes corrosive.

Chaff boards, cutting boards and fibre boards prepared using synthetic resins as binding agents are highly water-absorptive, thus they cannot be used as durable building elements in the building industry, and have the further disadvantage of high manufacture costs. Such boards are at present used mainly for the preparation of furniture.

Pearlite boards produced with portland cement, water-glass or urea-formaldehyde binding agents are disadvantageous because of their high water-absorptivity. A further disadvantage of pearlite boards produced with bitumen binding agent (the so-called bitumen-pearlite) is the extremely low compressive strength, due to which such boards cannot be pre-shaped but have to be produced at the site of building. Such boards have the further disadvantage that their permanent thermal stability is at most 50°C.

In these processes none of the binding agents mentioned above together with cellulose-containing materials or mineral base materials led to heat-insulating boards of acceptable properties in all respects, i.e., of low bulk density, appropriate heat-insulating capacity, high compressive strength and permanent thermal stability of at least 100°C.

All of the heat-insulating boards produced with water-absorptive binding agents, such as portland cement, magnesia cement, gypsum, water-glass and urea-formaldehyde resin, are highly water-absorptive, which decreases the heat-insulating capacity and compressive strength of the boards, and thus limits their scope of application.

Heat-insulating boards with bitumen or black pitch binding agents have low permanent thermal stabilities (at most 50° to 60°C) and low compressive strengths.

The invention aims at the production of building units of low bulk density, high compressive strength, resistant to moisture and having high (at least 100°C) permanent thermal stability and good heat-insulating capacity by using cellulose containing base materials and/or mineral base materials.

The invention is based on the discovery that when a cellulose-containing base material and/or mineral base material is heated to an appropriate temperature and mixed with a melt of residual oil and/or coal distillation residue and optionally with a natural or synthetic resin in such a way that prior to mixing a hydroxide and/or oxide of an alkali metal and/or alkaline earth metal is added to the base material and/or to the distillation residue, a chemical reaction takes place between the distillation residue and the hydroxides and/or oxides, whereupon water and lower hydrocarbons are liberated. Due to this reaction the binding agent foams, its viscosity decreases to a great extent, and consequently a uniform and thin coating can be formed on the particles of the base material.

The invention is based further on the discovery that as a result of the chemical reaction between the distillation residue and the hydroxides and/or oxides a binding agent of higher softening point is obtained which, after cooling, has a far greater compressive strength than the starting substance.

Consequently the invention relates to a process for preparing building units from cellulose-containing base materials and/or mineral base materials, using residual oil and/or coal distillation residues, oxides and/or hydroxides of alkali metals and/or alkaline earth metals, and optionally resins and/or foaming agents and/or other additives.

According to the invention one proceeds as follows: 15 to 85% by weight of a cellulose-containing base material and/or mineral base material are mixed at 120° to 250°C with 10 to 65 % by weight of 120° to 250° C melt of a of a residual oil and/or coal distillation residue, prior to mixing 1 to 20% by weight of an oxide and/or hydroxide of an alkali metal and/or alkaline earth metal are added to the base material and/or to the distillation residue, mixing is continued at least for one minute, and the obtained material is shaped at a temperature above 80°C.

According to a preferred method of the invention 20 to 80 % by weight of a cellulose-containing base material and/or mineral base material are mixed at 160° to 200°C with 10 to 55% by weight of a 160° to 200°C melt of a residual oil and/or coal distillation residue, prior to mixing, 1 to 15 % by weight of an oxide and/or hydroxide of an alkali metal and/or alkaline earth metal are added to the base material and/or to the distillation residue, mixing is continued for 4 to 6 minutes, and the obtained material is shaped at 130° to 150°C.

According to a further preferred method of the invention 15 to 85 % by weight of cellulose-containing base material and/or mineral base material are mixed with 1 to 20 % by weight of an oxide and/or hydroxide of an alkali metal and/or alkaline earth metal and optionally also with a foaming agent, the thus-obtained mixture is heated to 120° to 250°C, thereafter a 120° to 250°C melt of 10 to 65 % by weight of a residual oil and/or coal distillation residue and 0.1 to 10 % by weight of a resin is blended with the above mixture, and the obtained material is shaped.

This process variant is preferably carried out as follows: 20 to 80 % by weight of a cellulose-containing material and/or mineral base material are mixed with 1 to 15 % by weight of an oxide and/or hydroxide of an alkali metal and/or alkaline earth metal and optionally also with a foaming agent, the thus-obtained mixture is heated to 160° to 200°C, thereafter a 160° to 200°C melt of 10 to 55 % by weight of a residual oil and/or coal distillation residue and 1 to 6 % by weight of a resin is blended with the above mixture, and the obtained material is shaped.

One may preferably proceed also as follows: 15 to 42.5 % by weight of a cellulose-containing base material and 15 to 42.5% by weight of a mineral base material are mixed with 1 to 5% by weight of an alkali metal oxide or hydroxide, 3 to 15% by weight of an alkaline earth metal oxide or hydroxide and optionally with a foaming agent, the obtained mixture is heated to 120° to 250°C, thereafter a 120° to 250°C melt of 9 to 60 % by weight of a residual oil, 1 to 5% by weight of a coal distillation residue and 0.1 to 10% by weight of a resin is blended with the above mixture, and the obtained material is shaped.

This prpocess variant is preferably carried out as follows: 20 to 40% by weight of a cellulose-containing base material and 20 to 40% by weight of a mineral base material are mixed with 1 to 3% by weight of an alkali metal oxide or hydroxide, 3 to 12% by weight of an alkaline earth metal oxide or hydroxide, and optionally with a foaming agent, the obtained mixture is heated to 160° to 200°C, blended with a 160° to 200°C melt of 10 to 50% by weight of a residual oil, 1 to 5% by weight of a coal distillation residue and 1 to 6% by weight of a resin, and the material is shaped.

According to a further preferred method of the invention 1 to 20% by weight of an oxide and/or hydroxide of an alkali metal and/or alkaline earth metal are added to the 120° to 250°C melt of 10 to 65% by weight of a residual oil and/or coal distillation residue and 0.1 to 10% by weight of a resin, this melt is blended with a 120° to 250°C mixture of 15 to 85% by weight of a cellulose-containing base material and/or mineral base material and 0.1 to 5.0% by weight of a foaming agent, and the obtained material is shaped.

This latter process variant is preferably carried out as follows: 1 to 15% by weight of an oxide and/or hydroxide of an alkali metal and/or alkaline earth metal are added to a 160° to 200°C melt of 10 to 55% by weight of a residual oil and/or coal distillation residue and 1 to 6% by weight of a resin, the melt is blended with a 160° to 200°C mixture of a 20 to 80% by weight of cellulose-containing base material and/or mineral base material and 0.1 to 4.0% by weight of a foaming agent, and the obtained material is shaped.

According to another preferred method of the invention 1 to 5% by weight of an alkali metal oxide or hydroxide and 3 to 15% by weight of an alkaline earth metal oxide or hydroxide are of foaming agent, and to the 120° to 250°C melt of 9 to 60% by weight of a residual oil, 1 to 5% by weight of a coal distillation residue and 0.1 to 10% by weight of a resin, the melt is blended with a 120° to 250°C mixture of 15 to 42.5% by weight of a cellulose-containing base material, 15 to 42.5% by weight of a mineral base material and 0.1 to 5.0% by weight of a foaming agent, the obtained material is shaped.

This latter procedure can be carried out preferably as follows: 1 to 3% by weight of an alkali metal oxide or hydroxide and 3 to 12% by weight of an alkaline earth metal oxide or hydroxide are added to a 160° to 200°C melt of 15 to 50% by weight of a residual oil, 1 to 5% by weight of a coal distillation residue and 1 to 6% by weight of a resin, this melt is blended with a 160°to to 200°C mixture of 20 to 40% by weight of a cellulose containing base material, 20 to 40% by weight of a mineral base material and 0.1 to 4.0% by weight of a foaming agent, and the obtained material is shaped.

According to a still further preferred method of the invention 15 to 85% by weight of a cellulose-containing base material and/or mineral base material are mixed with 1 to 10% by weight of an oxide and/or hydroxide of an alkali metal and/or alkaline earth metal and 0.1 to 2.5% by weight of a foaming agent, the obtained mixture is heated to 120°to to 250°C, thereafter it is blended with a 120° to 250°C melt of 10 to 65% by weight of a residual oil and/or coal distillation residue and 0.1 to 10% by weight of a resin, and the obtained material is shaped.

This latter procedure is preferably carried out as follows: 20 to 80 % by weight of a cellulose-containing base material and/or mineral base material are mixed with 1 to 8 % by weight of an oxide and/or hydroxide of an alkali metal and/or alkaline earth metal and with 0.1 to 2.0 % by weight of a foaming agent, the mixture is heated to 160° to 200°C, thereafter it is blended with a 160° to 200°C melt of 10 to 55 % by weight of a residual oil and/or coal distillation residue, 1 to 8 % by weight of an oxide and/or hydroxide of an alkali metal and/or alkaline earth metal and 1 to 6 % by weight of a resin, and the obtained mixture is shaped.

According to a still further preferred process variant one may proceed also as follows: 11 to 42.5 % by weight of a cellulose-containing base material and 15 to 42.5 % by weight of a mineral base material are mixed with 0.5 to 2.5 % by weight of an alkali metal oxide or hydroxide, 1.5 to 7.5 % by weight of an alkaline earth metal oxide or hydroxide and 0.1 to 2.5 % by weight of a foaming agent, the obtained mixure is heated to 120° to 250°C, thereafter it is blended with a 120° to 250°C, melt of 9 to 60 % by weight of a residual oil, 1 to 5 % by weight of a coal distillation residue, 1.5 to 7.5 % by weight of an alkaline earth metal oxide or hydroxide, 0.5 to 2.5 % by weight of an alkali metal oxide or hydroxide and 0.1 to 10 % by weight of a resin, and the obtained material is shaped.

This latter procedure is preferably carried out as follows: 20 to 40 % by weight of a cellulose-containing base material and 20 to 40 % by weight of a mineral base material are mixed with 0.5 to 2.0 % by weight of an alkali metal oxide or hydroxide, 1.5 to 6.0 % by weight of an alkaline earth metal oxide or hydroxide and 0.1 to 2.0 % by weight of a foaming agent, the mixture is heated to 160° to 200°C, thereafter it is blended with a 160° to 200°C melt of 10 to 50% by weight of a residual oil, 1 to 5 % by weight of a coal distillation residue, 0.5 to 2.0 % by weight of an alkali metal oxide or hydroxide, 1.5 to 6.0 % by weight of an alkaline earth metal oxide or hydroxide and 1 to 6 % by weight of a resin, and the obtained material is shaped.

As cellulose-containing base material preferably rice hull, sunflower seed hull, linseed hull, peach stone shell, nut shell, peanut shell, corn stalk, sunflower stalk, corn cob, sawdust, cuttings, twig, bast fibre, wheat straw, rape straw, barley straw, ray straw, flax tow, linen harl, hemp harl, dry tobacco stalk, dry poppy stalk, cane, vinestalk, pine needle, seedbeet stalk, seedhemp stalk, sorghum stalk, sedge or bulrush can be used.

Among the mineral base materials the following are the most advantageous: swollen perlite, swollen clay hogging, fly ash, sand, hogging, slag or crushed stone.

The most preferred alkali metal oxide or hydroxide is sodium or potassium oxide or hydroxide, while among the alkaline earth metal oxides or hydroxides calcium and magnesium oxide or hydroxide are most preferably used.

As oil distillation residue, bitumen having a softening point of about 80°C., black pitch, acid sludge or a mixture thereof is preferably used.

The most preferred resins applicable in the process according to the invention are colophony and resol.

At a temperature of 120° to 250°C a chemical reaction sets in between the residual oil and/or coal distillation residue and the oxide or hydroxide compound, and in this reaction water vapour and lower hydrocarbons are liberated. Due to this reaction the binding agent foams and its viscosity decreases to a great extent. Consequently, the binding agent forms a uniform thin coating on the surface of the base material particles. Building units of the desired bulk densities, compressive strengths and heatinsulating properties can be obtained by heat-shaping the obtained material.

As foaming agents substances known in the art, such as ammonium carbonate decomposing at 60° to 80°C, oxy-bis-benzenesulfohydrazine decomposing at 150° to 160°C, N,N-dinitroso-pentamethylenetetramine decomposing at 200°C, etc. can be used. The foaming agent is preferably applied to the cellulose-containing and/or mineral base material at a temperature below the decomposition point. In this event the foaming agent may be sprayed onto the surface of the base material.

The cellulose-containing base materials are clipped in an appropriate apparatus, such as hammer-mill, straw cutter etc., to the desired size.

The process according to the invention can be carried out in any type of the known heated mixing apparatuses, such as in a bitumen- or asphalt-mixer. The residual oils and/or coal distillation residues are stored preferably in a warm state in known heated apparatuses, for instance, in a bitumen-heating apparatus.

The building units as prepared with the process according to the invention are shaped preferably in metal patterns, the desired pressing force being ensured by a hand-operated press or machine pressure. The warm material can also be shaped by means of a belt press.

When shaping the material prepared according to the invention and using a pressure of 0.1 to 0.5 kg/cm$^2$, shaped units of 150 to 300 kg./m$^3$ bulk densities and of 1 to 50 kg./cm$^2$ final compressive strengths are obtained. When producing shaped units of higher compressive strengths, pressures of 0.2 to 50 kg./cm$^2$, depending on the base material, are applied. In this event the final compressive strength of the product may be increased to 50 to 250 kg./cm$^2$, with a bulk density of 300 to 600 kg./m$^3$.

Fibre sheets, metal sheets, plastic sheets, eternite sheets, plastic or metal foils can be fitted onto one or both sides of the shaped units prepared according to the invention by shaping on these sheets or foils and pressing together the warm mass and said sheets or foils, or by heating the surface of the building unit and placing the appropriate sheet or foil onto the warm surface.

The building units prepared according to the invention can be coated with conventional mortars or plasters, synthetic plasters, synthetic resins, as well as with paints and dyes.

After heating to an appropriate temperature, the building units prepared according to the invention can be re-shaped.

The process of the invention is the first one in which different cellulose-containing waste materials, formed in the production or working-up of several agricultural, forest economical and industrial products, can be used with excellent results. A substantial part of these cellulose-containing materials appears as a waste in the industry, and until now great sums had to be invested into their elimination.

According to the process of the invention these waste materials can be converted to valuable industrial products which, because of the low costs of their largescale production, are of great importance in the building industry all over the world.

The building units prepared according to the invention have good heat-insulating capacities, permanent thermal stabilities of at least 80° to 100°C, compressive strengths of about 10 to 250 kg./cm$^2$, bulk densities of about 150 to 600 kg./m$^3$, they resist the effects of weak acids and alpalis, they are water-proof, and resist the action of bacteria and fungi. They have the further advantages that they can be easily plastered, painted, nailed, sawn and cemented, and are stable under loading.

A further advantage of the building units prepared with the process according to the invention is that they can also be used as roof insulating materials. In this instance they can be placed into the hot bitumen, and can be completely insulated from the rainfall by covering them with tar boards. By means of these elements the moisture can be easily led off. When heated, the elements can be adjusted to the shape of the building. The units of 80 to 120 kg./cm² compressive strengths can be used to gread advantage in floor covering, since they can be cemented onto the surface of concrete, have good heat- and sound-insulating capacities, and can be tight-fitted. They can be used as floor coverings under the parquet or mosaic covering even in damp places. The building units covered on both sides with covers or plaster can also be used as separating walls; in this respect their low bulk density, good sound-insulating capacity and high dimensional accuracy represent further great advantages. The building units can also be used in the thermal insulation of icestores, because of their excellent heat-insulating capacity and insensitivity to moisture, and since they can be built in quickly and easily. The building units covered on one or both sides with plaster can also be used in week-end houses. The new building units are superior to wood as form panels, since they do not absorb humidity, and thus the concrete has to be sprinkled less frequently. Since the building units prepared according to the invention can be sawn, cut and nailed just like wood, their use does not require special training. The building units once used as form panels can be crushed and worked up again, while wooden form panels cannot be used even as firewood.

The invention is further elucidated by the aid of the following non-limiting Examples.

EXAMPLE 1

41 % by weight of straw cut into 3 to 10 cm. pieces (bulk density: 30 kg./m³) are mixed with 7 % by weight of calcium hydroxide, and the mixture is heated to 120° to 250°C. 45 % by weight of bitumen are melted with 7 % by weight of colophony (colophony is added to the molten bitumen), and the obtained mixture is heated to 120° to 250°C. At this temperature the hot mixture of straw and calcium hydroxide is added to the melt under constant stirring. The material obtained is shaped immediately after mixing in a steel pattern to obtain heat-insulating boards of 5 cm. thickness. After cooling the ready boards are removed from the pattern.

The mechanical characteristics of the thus-obtained kg./m boards are as follows: bulk density: 200 kg./cm³; compressive strength: 8.0 kg./cm².

EXAMPLE 2

Heat-insulating boards of 10 cm. thickness are prepared as described in Example 1, starting with 43 % by weight of cane cut into 3 to 10 cm. pieces (bulk density: 100 kg./m³), 5 % by weight of calcium hydroxide, 2 % by weight of magnesium hydroxide, 43 % by weight of bitumen and 5 % by weight of colophony. The mechanical characteristics of the boards obtained are as follows: bulk density: 200 kg./m³: compressive strength: 8.0 kg./cm².

EXAMPLE 3

Heat-insulating boards of 5 cm. thickness are prepared as described in Example 1, starting from 44 % by weight of sunflower seed hull (bulk density: 120 kg./m³), 3 % by weight of calcium hydroxide, 6 % by weight of magnesium hydroxide, 20 % by weight of bitumen, 13 % by weight of black pitch and 10 % by weight of colophony. The mechanical characteristics of the boards obtained are as follows: bulk density: 300 kg./cm³; compressive strength: 8.0 kg./cm².

EXAMPLE 4

Heat-insulating boards of 5 cm. thickness are prepared as described in Example 1, starting from 40 % by weight of cuttings of 0.1 to 0.5 cm. length (bulk density: 25 kg./m³), 8 % by weight of calcium hydroxide, 44 % by weight of bitumen and 8 % by weight of resol. The mechanical characteristics of the boards obtained are as follows: bulk density: about 350 kg./m³; compressive strength: 10.0 kg./cm².

EXAMPLE 5

Heat-insulating boards of 10 cm. thickness are prepared as described in Example 1 starting from 39 % by weight of rice hull (bulk density: 100 kg./m³), 8 % by weight of magnesium hydroxide, 45 % by weight of bitumen, 4 % by weight of resol and 4 % by weight of colophony. The mechanical characteristics of the boards obtained are as follows: bulk density: about 400 kg./m³, compressive strength: 5.5 kg./cm².

EXAMPLE 6

Heat-insulating boards of 6 cm. thickness are prepared as described in Example 1, starting from 48 % by weight of perlite (bulk density: 90 kg./m³), 6.5 % by weight of magnesium hydroxide, 39 % by weight of bitumen and 6.5 % by weight of colophony. The mechanical characteristics of the boards obtained are as follows: bulk density: 275 kg./m³; compressive strength: 10.5 kg./cm².

EXAMPLE 7

Heat-insulating boards of 5 cm. thickness are prepared as described in Example 1, starting with 32 % by weight of cane, 14 % by weight of straw, 7 % by weight of calcium hydroxide, 3 % by weight of colophony, 4 % by weight of resol and 40 % by weight of bitumen. The mechanical characteristics of the boards obtained are as follows: bulk density: about 200 kg./m³, compressive strength: 5.0 kg./cm².

EXAMPLE 8

Heat-insulating boards of 10 cm. thickness are prepared as described in Example 1, starting from 37 % by weight of perlite, 9 % by weight of straw, 9 % by weight of magnesium hydroxide, 37 % by weight of bitumen and 8 % by weight of resol. The mechanical characteristics of the boards obtained are as follows: bulk density: about 250 kg./m³; compressive strength: 8.0 kg./cm².

EXAMPLE 9

Heat-insulating boards of 5 cm. thickness can be prepared as described in Example 1, starting from 16 % by weight of corn cob (bulk density: 200 kg./m³) 18 % by weight of corn stalk (bulk density: 150 kg./m³), 12 % by weight of straw, 6 % by weight of calcium hydroxide, 43 % by weight of black pitch, 3 % by weight of colophony and 2 % by weight of resol. The mechanical characteristics of the boards obtained are as follows: bulk density: 250 kg./m$^3$; compressive strength: 5.5 kg./cm$^2$.

EXAMPLE 10

Heat-insulating boards of 10 cm. thickness are prepared as follows: 16 % by weight of bast fibre (bulk density: 80 kg./m$^3$), 13 % by weight of corn cob, 13 % by weight of rice hull, 8 % by weight of straw, and 1 % by weight of oxy-bis-benzenesulfohydrazine are mixed and heated to 130°C, thereafter a pre-reacted binding agent made of 25 % by weight of bitumen, 10 % by weight of black pitch, 6 % by weight of colophony, 2 % by weight of resol, 6 % by weight of calcium hydroxide and 2 % by weight of magnesium hydroxide is sprayed onto the mixture at 170 to 200°C under continuous stirring. The thus-obtained material is heat-shaped as described in Example 1. The mechanical characteristics of the boards obtained are as follows: bulk density: 290 kg./m$^3$; compressive strength: 18 kg/cm$^2$.

EXAMPLE 11

30 % by weight of chopped corn cob, 23 % by weight of rice hull, 4 % by weight of calcium hydroxide, 4 % by weight of magnesium hydroxide, 25 % by weight of bitumen, 10 % by weight of black pitch, 3 % by weight of colophony and 3 % by weight of resol are introduced without preheating into a heated container equipped with a stirrer, thereafter the mixture is heated to 150 to 200°C. When the reaction terminates, the material is heat-shaped in steel patterns under a pressure of 30 kg./cm$^2$. By this process 10 cm. thick building units of 450 kg./m$^3$ bulk densities are obtained which, after cooling, have a compressive strength of 30 kg./cm$^2$.

EXAMPLE 12

The process described in Example 10 is repeated with the difference that, instead of 6 % by weight of calcium hydroxide, 6 % by weight of sodium hydroxide, and instead of 2 % by weight of magnesium hydroxide 2 % by weight of calcium hydroxide are used. By this process 10 cm. thick building units of 285 kg./m$^3$ bulk density are obtained; compressive strength: 16 kg./cm$^2$.

EXAMPLE 13

Heat insulating boards of 300 kg./m$^3$ bulk densities and 10 cm. thickness are prepared as described in Example 1, starting from 55 % by weight of vinestalk of 2 to 8 cm. length, 3 % by weight of wheat straw, 3 % by weight of calcium hydroxide, 3 % by weight of magnesium hydroxide, 4 % by weight of colophony, 2 % by weight of resol, 25 % by weight of bitumen and 5 % by weight of black pitch. The obtained products have a compressive strength of 73 kg./cm$^2$

EXAMPLE 14

A mixture of 30 % by weight of vinestalk of 2 to 5 cm. length, 20 % of comminuted vinestalk of 2 to 5 cm. length, 10 % by weight of swollen perlite and 1 % by weight of oxy-bis-benzenesulfohydrazine is heated to 150°C; thereafter a pre-reacted mixture of 20 % by weight of bitumen, 10 % by weight of black pitch, 3 % by weight of colophony, 2 % by weight of resol, 2.5 % by weight of calcium hydroxide and 2.5 % by weight of magnesium hydroxide is poured onto the mixture at a temperature of 180° 200°200 C under continuous stirring. The binding agent forms a uniform thin coating on the particles of the base material. The material is shaped in a 100 × 50 × 50 cm. hollow steel mould under a pressure of 20 kg./cm$^2$. The thus-obtained building units have a bulk density of 456 kg./m$^3$. A 0.5 m$^2$ weighs 22.8 kg., and has a compressive strength of 93 kg./cm$^2$. The units are coated on both sides with gypsum in a thickness of 0.5 to 1.0 cm.

EXAMPLE 15

46 % by weight of household refuse containing paper, textile, slag and ceramic waste materials are chopped to 3 to 10 cm. size, 10 % by weight of calcium hydroxide are added, and the mixture is heated to 150 to 200°C. Thereafter 40 % by weight of bitumen are melted together with 4 % by weight of colophony, the melt is heated to 150° to 200°C, and added to the first mixture under continuous stirring. The thus-obtained material is heat-shaped in steel patterns to give heat-insulating units of 20 cm. thickness. Bulk density: 600 kg./m$^3$; compressive strength: 65 kg./cm$^2$.

EXAMPLE 16

One proceeds as described in Example 15, starting from 46 % by weight of flax-tow, 40 % by weight of bitumen, 4 % by weight of colophony, 8 % by weight of calcium hydroxide and 2 % by weight of sodium hydroxide. The mechanical characteristics of the heat-insulating boards prepared with a thickness of 6 cm. are as follows: bulk density: about 350 kg./m$^3$; compressive strength: 12.5 kg./cm$^2$; heat-transfer coefficient: 0.075 kcal/m.h.°C.

EXAMPLE 17

50 % by weight of household refuse free of metallic, ceramic and glass waste materials are cut to 3 to 10 cm. size, dried at 120° to 150°C under constant stirring, thereafter 10 % by weight of powdery lime hydrate are added with stirring, and the obtained mixture is heated to 150° to 200°C. In the meantime a melt is prepared from 36 % by weight of bitumen and 4 % by weight of colophony. This melt is heated to 150° to 200°C, and added to the first mixture under continuous stirring. The thus-obtained material is heat-shaped in steel patterns to give heat-insulating boards of 10 cm. thickness; bulk density: 500 kg./m$^3$; compressive strength: 35 kg./cm$^2$.

EXAMPLE 18

38 % by weight of ground waste rubber are mixed with 12 % by weight of powdery line hydrate, and the obtained mixture is heated to 160° to 200°C. Thereafter a 160° to 200°C melt of 46 % by weight of bitumen (softening point: 80°C) and 4.0 % by weight of colophony is added to the mixture under constant stirring. The material obtained is heat-shaped to 60 × 120 × 5 cm. plates of 1,000 kg./m$^3$ bulk density and 14 kg./cm$^2$ compressive strength.

EXAMPLE 19

20 % by weight of mixed carded textile are mixed with 14 % by weight of powdery line hydrate, and the mixture is heated to 120° to 160°C. Thereafter a 160° to 200°C melt of 60 % by weight of bitumen having a softening point of 80°C and 6 % by weight of colophony is added under stirring, and the obtained material is heat-shaped to plates of 50 × 100 × 5 cm. dimensions. The mechanical characteristics of the obtained plates are as follows: bulk density: 1,000 kg./m$^3$; compressive strength: 20 kg./cm$^2$; heat-transfer coefficient: 0.141 kcal/m.h.°C.

EXAMPLE 20

70 % by weight of ground scrap glass are mixed with 4 % by weight of powdery lime hydrate, and the mixture is heated to 160° to 200°C. 5 % of powdery lime hydrate are added to a 160 to 200°C melt of 15 % by weight of acid resin, 5.5 % by weight of bitumen having a softening point of 80°C and 0.5 % by weight of colophony, and the obtained hot melt is added to the preheated first mixture. The material obtained is heat-shaped to flooring plates of 50 × 100 × 10 cm. dimensions. The mechanical characteristics of the plates are as follows: bulk density: 2,000 kg./m$^3$; compressive strength: 50 kg./cm$^2$.

The plates, boards, etc. as prepared in compliance with the above Examples can be coated with metal, e.g. aluminum or steel, wood-fibre, decorite, eternite, bakelite, plexiglass, reinforced polyester etc. sheets.

What we claim is:

1. A process for preparing building units from cellulose-containing base materials and oil distillation residues, comprising mixing 15 to 85 % by weight of cellulose-containing base material with 1 to 20% by weight of a member selected from the group consisting of alkali metal ozide, alkali metal hydroxide, alkaline earth metal oxide, alkaline earth metal hydroxide and a mixture thereof, then adding 10 to 65% by weight of a 120° to 250°C. melt of oil distillation residue selected from the group consisting of bitumen having a softening point of about 80°C., black pitch and acid sludge and a mixture thereof to the obtained mixture at a temperature of 120° to 250°C., then mixing for at least one minute, and then shaping the obtained material at a temperature above 80°C.

2. A process as claimed in claim 1, in which 0.1 to 10% by weight of a resin is added to the reaction mixture.

3. A process for preparing building units from cellulose-containing base materials and oil distillation residues, comprising mixing 10 to 65% by weight of a 120° to 250°C. melt of oil distillation residue selected from the group consisting of bitumen having a softening point of about 80°C., black pitch and acid sludge and a mixture thereof with 1 to 20% by weight of a member selected from the group consisting of alkali metal oxide, alkali metal hydroxide, alkaline earth metal oxide, alkaline earth metal hydroxide and a mixture thereof, then adding 15 to 85% by weight of cellulose-containing base material and 0.1 to 5% by weight of a foaming agent to the obtained mixture at a temperature of 120° to 250°C., then mixing for at least one minute, and then shaping the obtained material at a temperature above 80°C.

4. A process as claimed in claim 3, in which 0.1 to 10% by weight of a resin is added to the reaction mixture.

5. A process for preparing building units from inorganic mineral base material and oil distillation residues, comprising mixing 15 to 85% by weight of the mineral base material with 1 to 20% by weight of a member selected from the group consisting of alkali metal oxide, alkali metal hydroxide, alkaline earth metal oxide, alkaline earth metal hydroxide and a mixture thereof, then adding 10 to 65% by weight of a 120° to 250°C. melt of oil distillation residue selected from the group consisting of bitumen having a softening point of about 80°C., black pitch and acid sludge and a mixture thereof to the obtained mixture at a temperature of 120° to 250°C., then mixing for at least one minute, and then shaping the obtained material at a temperature about 80°C.

6. A process as claimed in claim 5, in which 0.1 to 10% by weight of a resin is added to the reaction mixture.

7. A process for preparing building units from inorganic mineral base materials and oil distillation residues, comprising mixing 10 to 65% by weight of a 120° to 250°C. melt of oil distillation residue selected from the group consisting of bitumen having a softening point of about 80°C., black pitch and acid sludge and a mixture thereof with 1 to 20% by weight of a member selected from the group consisting of alkali metal oxide, alkali metal hydroxide, alkaline earth metal oxide, alkaline earth metal hydroxide and a mixture thereof, then adding 15 to 85% by weight of mineral base material and 0.1 to 5% by weight of a foaming agent to the obtained mixture at a temperature of 120° to 250°C., then mixing for at least one minute, and shaping the obtained material at a temperature above 80°C.

8. A process as claimed in claim 7, in which 0.1 to 10% by weight of a resin is added to the reaction mixture.

9. A process as claimed in claim 1, in which the cellulose-containing base material is a member selected from the group consisting of rice hull, sunflower seed hull, linseed hull, peach stone shell, not shell, peanut shell, corn stalk, sunflower stalk, corn cob, sawdust, cuttings, twig, bast fiber, wheat straw, rape straw, barley straw, ray straw, flax tow, linen harl, hemp harl, dry tobacco stalk, dry poppy stalk, cane, seedbeet vinestalk, pine needle, seedbeet stalk, seedhemp stalk, sorghum stalk, sedge and bulrush.

10. A process as claimed in claim 3, in which the cellulose-containing base material is a member selected from the group consisting of rice hull, sunflower seed hull, linseed hull, peach stone shell, nut shell, peanut shell, corn stalk, sunflower stalk, corn cob, sawdust, cuttings, twig, bast fiber, wheat straw, rape straw, barley straw, ray straw, flaw tow, linen harl, hemp harl, dry tobacco stalk, dry poppy stalk, cane, vine-stalk, pine needle, seedbeet stalk, seedhemp stalk, sorghum stalk, sedge and bulrush.

11. A process as claimed in claim 5, in which the mineral base material is a member selected from the group consisting of swollen perlite, swollen clay hogging, fly ash, sand, hopping, slag and crushed stone.

12. A process as claimed in claim 7, in which the mineral base material is a member selected from the group consisting of swollen perlite, swollen clay hogging, fly ash, sand, hogging, slag and crushed stone.

13. A process as claimed in claim 1, in which the alkali metal oxide and hydroxide is selected from the group consisting of sodium and potassium oxide and hydroxide and the alkaline earth oxide and hydroxide is selected from the group consisting of calcium and magnesium oxide and hydroxide.

14. A process as claimed in claim 3, in which the alkali metal oxide and hydroxide is selected from the group consisting of sodium and potassium oxide and hydroxide and the alkaline earth metal oxide and hydroxide is selected from the group consisting of calcium and magnesium oxide and hydroxide.

15. A process as claimed in claim 5, in which the alkali metal oxide and hydroxide is selected from the group consisting of sodium and potassium oxide and hydroxide and the alkaline earth metal oxide and hydroxide is selected from the group consisting of calcium and magnesium oxide and hydroxide.

16. A process as claimed in claim 7, in which the alkali metal oxide and hydroxide is selected from the group consisting of sodium and potassium oxide and hydroxide and the alkaline earth oxide and hydroxide is selected from the group consisting of calcium and magnesium oxide and hydroxide.

17. A process as claimed in claim 2, in which the resin is a member selected from the group consisting of colophony and resol.

18. A process as claimed in claim 4, in which the resin is a member selected from the group consisting of colophony and resol.

19. A process as claimed in claim 6, in which the resin is a member selected from the group consisting of colophony and resol.

20. A process as claimed in claim 8, in which the resin is a member selected from the group consisting of colophony and resol.

* * * * *